(12) United States Patent
Roberts

(10) Patent No.: US 6,695,338 B1
(45) Date of Patent: Feb. 24, 2004

(54) GOOSENECK HITCH ASSEMBLY

(76) Inventor: Paul D. Roberts, 2630 Hwy. 120, Cody, WY (US) 82414

( * ) Notice: Subject to any disclaimer, the term of this patent is extended or adjusted under 35 U.S.C. 154(b) by 0 days.

(21) Appl. No.: 10/334,654

(22) Filed: Dec. 31, 2002

(51) Int. Cl.$^7$ .............................................. B62D 53/06
(52) U.S. Cl. .................................. 280/491.5; 280/514
(58) Field of Search ........................ 280/491.5, 433, 280/423.1, 504, 511, 514, 901

(56) References Cited

U.S. PATENT DOCUMENTS

| | | | |
|---|---|---|---|
| 3,336,051 A | * | 8/1967 | Dale ....................... 280/423.1 |
| 3,893,713 A | * | 7/1975 | Ivy ............................ 280/511 |
| 4,643,443 A | | 2/1987 | Husa |
| 4,657,274 A | * | 4/1987 | Mann et al. ................ 280/433 |
| 4,721,323 A | | 1/1988 | Czuk et al. |
| 5,011,178 A | | 4/1991 | Sanderson |
| 5,016,898 A | | 5/1991 | Works et al. |
| 5,143,393 A | | 9/1992 | Meyer |
| 5,145,199 A | | 9/1992 | Howard |
| 5,385,363 A | | 1/1995 | Morey |
| 5,472,222 A | | 12/1995 | Marcy |
| 5,577,751 A | | 11/1996 | Matthews |
| 5,707,070 A | | 1/1998 | Lindenman et al. |
| 5,755,452 A | | 5/1998 | Tambornino |
| 5,788,258 A | * | 8/1998 | Gill et al. ................. 280/491.1 |
| 5,839,745 A | | 11/1998 | Cattau et al. |
| 5,860,671 A | | 1/1999 | Mackeown |
| 5,861,802 A | | 1/1999 | Hungerink et al. |
| 5,871,222 A | | 2/1999 | Webb |
| 5,971,418 A | | 10/1999 | Lindenman et al. |
| 6,065,766 A | | 5/2000 | Pulliam |
| 6,095,545 A | | 8/2000 | Bol, II et al. |
| 6,099,015 A | | 8/2000 | Marcy |
| 6,199,890 B1 | | 3/2001 | Lindenman et al. |
| 6,409,202 B1 | | 6/2002 | Putnam |
| 6,520,528 B2 | * | 2/2003 | Fandrich et al. ............ 280/496 |
| 2002/0060443 A1 | | 5/2002 | Fandrich et al. |

OTHER PUBLICATIONS

Diamond Hitch brochure, produced Jun. 1, 2001.
Drawtite Manufacturing catalog, 2001. pp. 95–96.
Hidden Hitch Gooseneck Hitche, May 2001. p. 58.

* cited by examiner

Primary Examiner—Lesley D. Morris
Assistant Examiner—Tony Winner
(74) Attorney, Agent, or Firm—Clayton, Howarth & Cannon, P.C.

(57) ABSTRACT

A gooseneck hitch assembly for attaching to a tow vehicle such as a pickup truck. The hitch assembly may include a cylinder attached to the vehicle frame such that the cylinder extends through the vehicle cargo bed. A ball hitch may be removably inserted in the cylinder and may include a pair of slots for receiving projections in the interior of the cylinder. A locking member may be positioned on an upper portion of the ball hitch to secure the ball hitch to the cylinder and to provide a visual indication of the locked condition of the ball hitch. Grooves may be formed in the ball hitch to receive the cylinder projections so that the ball hitch may be stored in the cylinder in an inverted position. In the stored position, the bottom of the ball hitch may be flush with the top of the cylinder to prevent the ball hitch from obstructing the cargo bed.

39 Claims, 4 Drawing Sheets

GOOSENECK HITCH ASSEMBLY

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. The Field of the Invention

The present invention relates generally to hitch assemblies, and more particularly, but not necessarily entirely, to gooseneck hitch assemblies having a ball hitch that can be stored in a position so as to avoid obstructing the bed of a towing vehicle.

2. Description of Related Art

Trailer hitch assemblies of various types are known in the art. For example, trailer hitch assemblies are commonly attached to towing vehicles for towing gooseneck or fifth wheel trailers. Trailer hitches extending through the cargo bed of vehicles may cause an obstruction that reduces the use of the bed. Attempts have been made in the art to provide hitches that are positionable such that the bed is not obstructed. For example, U.S. Pat. No. 5,472,222 (granted Dec. 5, 1995 to Marcy) discloses a ball hitch and socket that is removably attached to a sleeve in a frame. A spring biased pin attached to the sleeve engages grooves formed on the exterior of the socket. The ball hitch and socket can be removed from the sleeve by rotating the hitch and socket to align the spring biased pin with an exit portion of the groove. The hitch and socket can then be lifted out of the sleeve, inverted, and inserted back into the sleeve such that the ball portion extends downwardly. In this position, the normally lower end of the socket is flush with the top side of the cargo bed so that the cargo bed is not obstructed by the ball. However, it may be difficult to align the spring biased pin with the exit portion of the groove. If the hitch and socked are rotated too far, or not far enough, the hitch cannot be removed from the sleeve. Moreover, the spring biased pin is not positioned in a visible location so that the locked condition of the hitch can be observed. This reduces the ability to visually check the security of the hitch.

Similarly, U.S. Pat. No. 5,016,898 (granted May 21, 1991 to Works et al.) discloses a hitch that is selectively positioned within a retention sleeve in an upright position or an inverted position to prevent the ball from obstructing the cargo bed. The hitch is secured in position with a locking assembly that includes a spring biased pin that is received in an opening in the hitch. The locking assembly is actuated with a handle that is positioned in a wheel well of the towing vehicle. Operation of the locking assembly in the wheel well while attempting to remove the hitch may be inconvenient and difficult to accomplish.

Also, U.S. Pat. No. 6,099,015 (granted Aug. 8, 2000 to Marcy) discloses a ball hitch having pins that are received in two connected slots in a sleeve secured to the mounting bracket. The ball hitch also has a resilient finger secured to the lower end of the ball hitch, and a vertical slot aligned with the finger. The finger protrudes away from the ball hitch to form a lock with the sleeve. The finger can be pressed into the vertical slot so as to release the lock with the sleeve so that the ball hitch can be rotated and removed from the sleeve. However, the configuration of the two distinct slots in the sleeve may make removal of the ball hitch difficult. Furthermore, debris may fall into the vertical slot in the ball hitch thereby making activation of the locking finger more difficult. Moreover, the configuration of the locking finger makes it susceptible to being snagged and damaged.

Thus, despite the advantages of the prior art, the prior art is characterized by several disadvantages that are addressed by the present invention. The present invention minimizes, and in some aspects eliminates, the above-mentioned failures, and other problems, by utilizing the methods and structural features described herein.

Thus, there is a need for an improved gooseneck hitch assembly that is simple to operate, in which the ball hitch can be removed from the cylinder, inverted, and replaced in the cylinder for storage such that the ball hitch does not provide an obstruction in the cargo bed of the tow vehicle. It would also be an improvement in the art to provide such a hitch assembly that has a locking member that can be visually checked to verify the locked status of the hitch assembly. The locking member should be durable and configured to prevent debris in the bed from rendering the locking member inoperable. It would be a further improvement to provide a hitch assembly that has redundant locking features that enhance the safety of the hitch assembly.

The features and advantages of the invention will be set forth in the description which follows, and in part will be apparent from the description, or may be learned by the practice of the invention without undue experimentation. The features and advantages of the invention may be realized and obtained by means of the instruments and combinations particularly pointed out in the appended claims.

BRIEF DESCRIPTION OF THE DRAWINGS

The features and advantages of the invention will become apparent from a consideration of the subsequent detailed description presented in connection with the accompanying drawings in which.

DETAILED DESCRIPTION OF THE INVENTION

Figure 1:
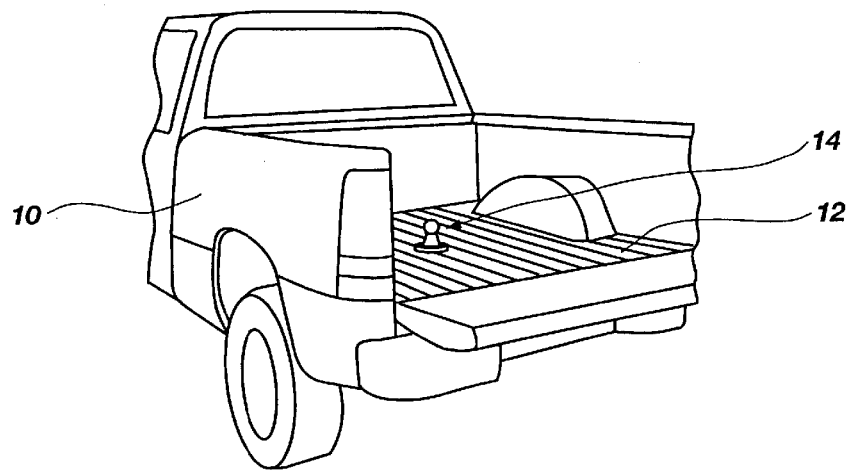
FIG. 1 is a break-away perspective view of a towing vehicle having a gooseneck hitch assembly projecting through the cargo bed.

For the purposes of promoting an understanding of the principles in accordance with the invention, reference will now be made to the embodiments illustrated in the drawings and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would normally occur to one skilled in the relevant art and having possession of this disclosure, are to be considered within the scope of the invention claimed.

As used herein, "comprising," "including," "containing," "characterized by," and grammatical equivalents thereof are inclusive or open-ended terms that do not exclude additional, unrecited elements or method steps.

Referring now to FIG. 1, a break-away perspective view of a towing vehicle 10 is shown having a cargo bed 12. A gooseneck hitch assembly, indicated generally at 14, may be installed through the cargo bed 12 so that a trailer (not shown), such as a gooseneck or fifth wheel trailer, may be attached to the towing vehicle 10. It will be appreciated that various different types of towing vehicles 10 may be used with the hitch assembly 14 of the present invention, such as a conventional pickup truck for example.

Figure 2:
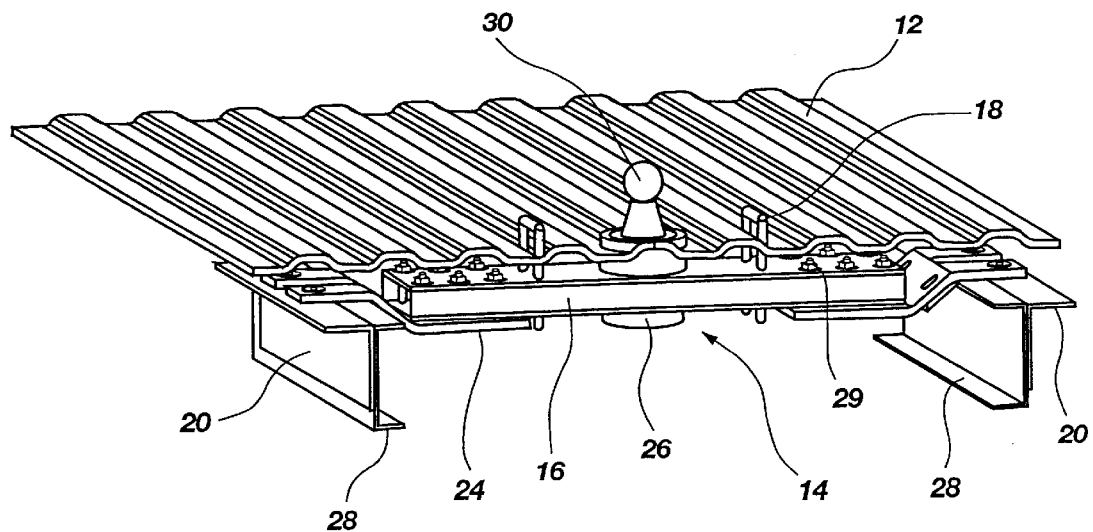
FIG. 2 is a partial perspective view of a gooseneck hitch assembly attached to the towing vehicle's frame and projecting through the cargo bed in accordance with the principles of the present invention.
Figure 3:
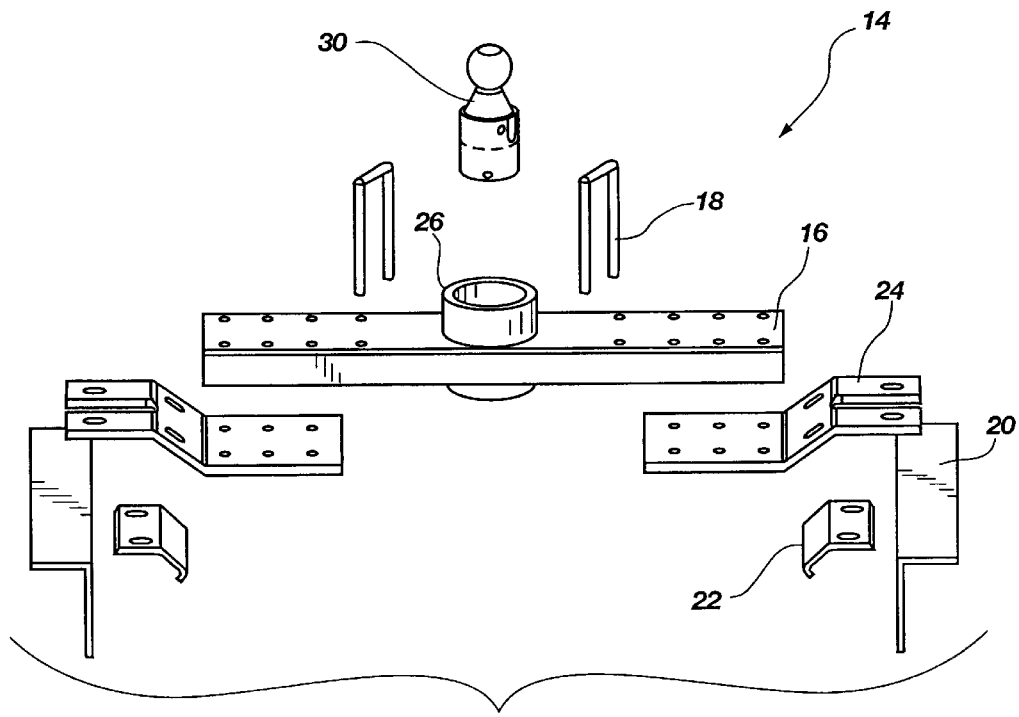
FIG. 3 is an exploded perspective view of the gooseneck hitch assembly of FIG. 2.

The hitch assembly 14 may be installed through the cargo bed 12 as shown most clearly in FIGS. 2–3. The hitch assembly 14 may include various different components for attachment to the towing vehicle 10 such as a cross member 16, safety chain loops 18, "L" brackets 20, clamps 22, and "Z" plates 24. These components may be configured to be installed underneath the cargo bed 12 on frame member 28 of the towing vehicle 10. A receiver cylinder or sleeve 26 may be attached to the cross member 16 and extend through the cargo bed 12 to be accessible from an upper side of the cargo bed 12. A ball hitch 30 may be removably installed in the sleeve 26 projecting above the cargo bed 12 for towing a trailer, or inverted and stored in the sleeve 26 as discussed more fully below, such that the cargo bed 12 may be maintained free from obstructions.

It will be appreciated that the various attachment components such as the cross member 16, "L" brackets 20, clamps 22, and "Z" plates 24 may be fastened to the frame member 28 using fasteners such as bolts 29, such that the towing vehicle 10 can be equipped with the hitch assembly 14 during original manufacturing of the tow vehicle 10, or the tow vehicle 10 can be retrofitted with the hitch assembly 14. It will also be appreciated that other attachment components or mechanisms may be used to attach the sleeve 26 to the frame member 28 within the scope of the present invention.

Figure 4:
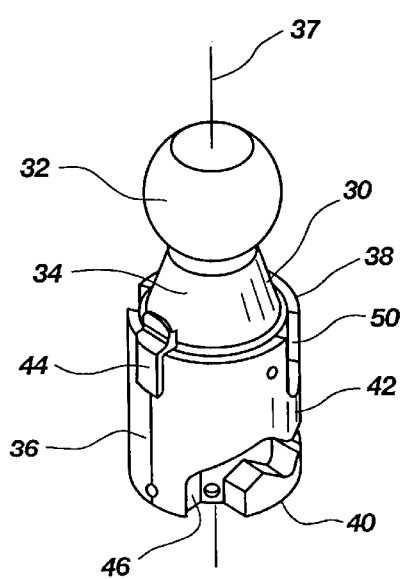
FIG. 4 is a perspective view of a ball hitch in accordance with the principles of the present invention.

Referring now to FIG. 4, a perspective view of the ball hitch 30 is shown. The ball hitch 30 may include a ball portion 32 for providing a surface to be attached to the trailer. The ball portion 32 may have a substantially spherical configuration for attaching to a trailer socket (not shown) in a manner know in the art.

The ball hitch 30 may also include a neck portion 34 attached to the ball portion 32 for supporting the ball portion 32. The neck portion 34 may have a frusto-conical configuration having a larger dimension at a bottom portion of the neck 34 and tapering in dimension toward the ball portion 32. It will be appreciated that the neck portion 34 may have other shapes and configurations within the scope of the present invention.

The ball hitch 30 may also include a base portion 36 at the bottom of the neck portion 34 for being received in and attached to the sleeve 26. The ball hitch 30 may define a longitudinal axis 37 extending from the base portion 36 through the neck portion 34 and ball portion 32.

The base portion 36 may have a cylindrical configuration having an upper surface 38 adjacent to the neck portion 34, and a lower surface 40 on an end of the base portion 36 opposite the upper surface 38. The base portion 36 may also have an exterior side surface 42. A locking member 44 may be positioned adjacent the upper surface 38 for locking the ball hitch 30 to the sleeve 26. The base portion 36 may also include at least one slot 46 positioned adjacent the lower surface 40 for receiving a projection 48 in the sleeve 26 as shown most clearly in FIG. 5.

Figure 5:
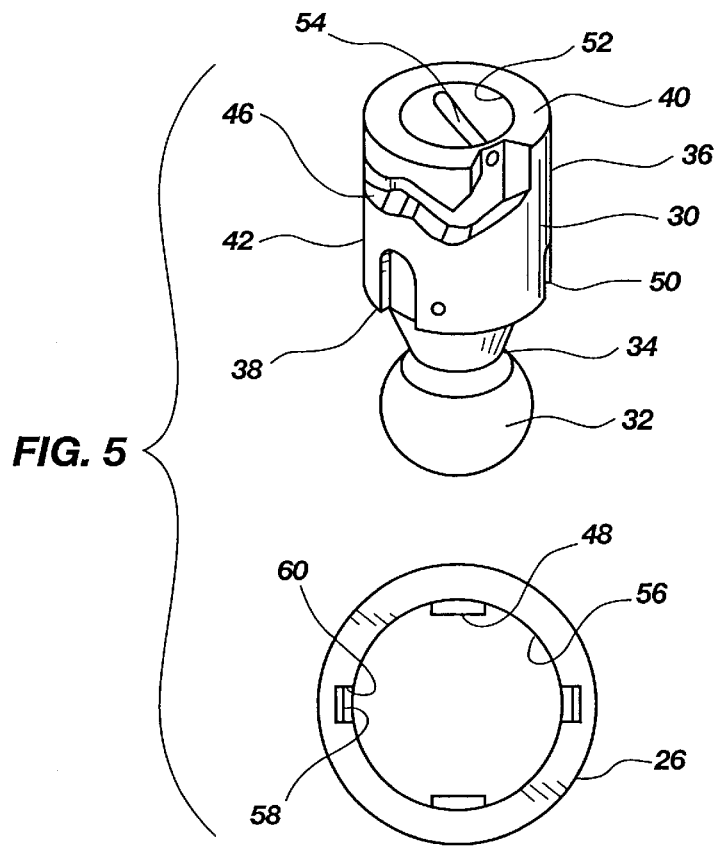
FIG. 5 is a bottom perspective view of the ball hitch of FIG. 4 and a top view of the receiver cylinder as the ball hitch is being positioned for storage in the receiver cylinder.

A groove 50 may be formed in the base portion 36 adjacent the upper surface 38 for also receiving the projection 48 when the ball hitch 30 is inserted into the sleeve 26 in an inverted orientation as shown in FIG. 5. The groove 50 may be sized to receive the projection 48 and extend to a location such that when the ball hitch 30 is inserted into the sleeve 26 in an inverted orientation, the ball hitch 30 may be supported so that the lower surface 40 of the ball hitch 30 is substantially flush with the top of the sleeve 26. The groove 50 may be spaced apart from the slot 46 such that the groove 50 does not intersect the slot 46. Accordingly, the groove 50 and slot 46 may be separate features of the ball hitch 30. It will be appreciated that two grooves 50 may be positioned on opposite sides of the ball hitch 30, or that other quantities of grooves may also be used.

As shown in FIG. 5, the lower surface 40 of the ball hitch 30 may include a cavity 52 and a handle 54 in the form of a pin inserted through and fixed to the base portion 36, so that the ball hitch 30 can be grasped and lifted out of the sleeve 26 when the ball hitch 30 is stored in the sleeve 26 in the inverted orientation. It will be appreciated that the handles 54 of other configurations may be used within the scope of the present invention.

The sleeve 26 may have a cylindrical configuration having an interior surface 56 configured to receive the ball hitch 30. The projection 48 may be fixed on the sleeve 26 and may extend from the interior surface 56 toward the center of the sleeve 26. In one embodiment, two projections are positioned on the interior surface 56 projecting toward each other on opposite sides of the interior surface 56. The projections may be pins with round cross sectional shapes that are configured and dimensioned to be received in the slot 46 of the ball hitch 30.

The sleeve 26 may also include at least one keeper 58 for receiving a portion of the locking member 44 on the ball hitch 30. The keeper 58 may be formed as a recess on the top of the interior surface 56, configured to form sidewalls 60 to abut with a portion of the locking member 44 to prevent the locking member 44 from rotating with respect to the sleeve 26.

Figure 6:
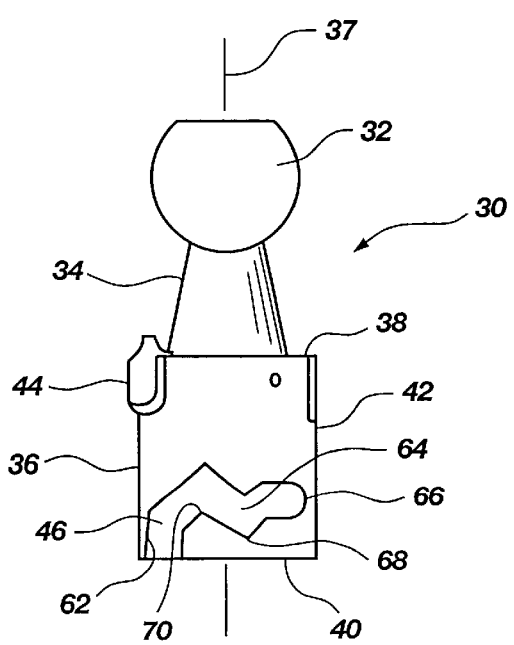
FIG. 6 is a side view of the ball hitch of FIG. 4.

Referring now to FIG. 6, a side view of the ball hitch 30 is shown illustrating the slot 46. It will be appreciated that the slot 46 may form a slot means for receiving a projection, within the scope of the present invention. The slot 46 may include a first portion 62 passing through the lower surface 40 of the base portion 36 and extending along the exterior side 42 in a direction substantially parallel to the longitudinal axis 37 of the ball hitch 30. The slot 46 may also include a second portion 64 extending in a lateral direction with respect to the first portion 62. The second portion 64 of the slot 46 may include a terminal portion 66 configured to hold the projection 48 to prevent movement of the ball hitch 30 with respect to the sleeve 26 in a direction along the longitudinal axis 37. The second portion 64 of the slot 46 may include a dip 68 disposed between the terminal portion 66 and the first portion 62 of the slot 46. The slot 46 may also include a ridge 70 disposed between the dip 68 and the first portion 62 of the slot 46. It will be appreciated that the dip 68 and the ridge 70 are configured to allow the ball hitch 30 to be rotated from a locked position in which the projection 48 is located at the terminal portion 66 of the slot 46, to a released position in which the projection 48 is located at the first portion 62 of the slot 46 and vice versa.

Moreover, the dip 68 and the ridge 70 provide a safety feature in that the ball hitch 30 must be acted upon by both vertical and rotational forces to move the ball hitch 30 from the locked position to the released position. Accordingly, even if the locking member 44 is released, the ball hitch 30 remains in the locked position unless simultaneous rotational and vertical forces are applied to the ball hitch 30 to lift and rotate the ball hitch 30 such that the projection 48 passes into the dip 68. The ball hitch 30 must be rotated further and additional vertical force must be applied to the ball hitch 30 to remove the ball hitch 30 from the sleeve 26. Thus, while the required sequence of forces applied to the ball hitch 30 is easily accomplished when the ball hitch 30 is intentionally removed from the sleeve 26, the chances of the ball hitch 30 inadvertently being moved from the locked position to the released position during operation of the ball hitch 30 are extremely low. The configuration of the slot 46 therefore provides an added safety feature in the event the locking member 44 becomes released or inoperable.

Figure 7:
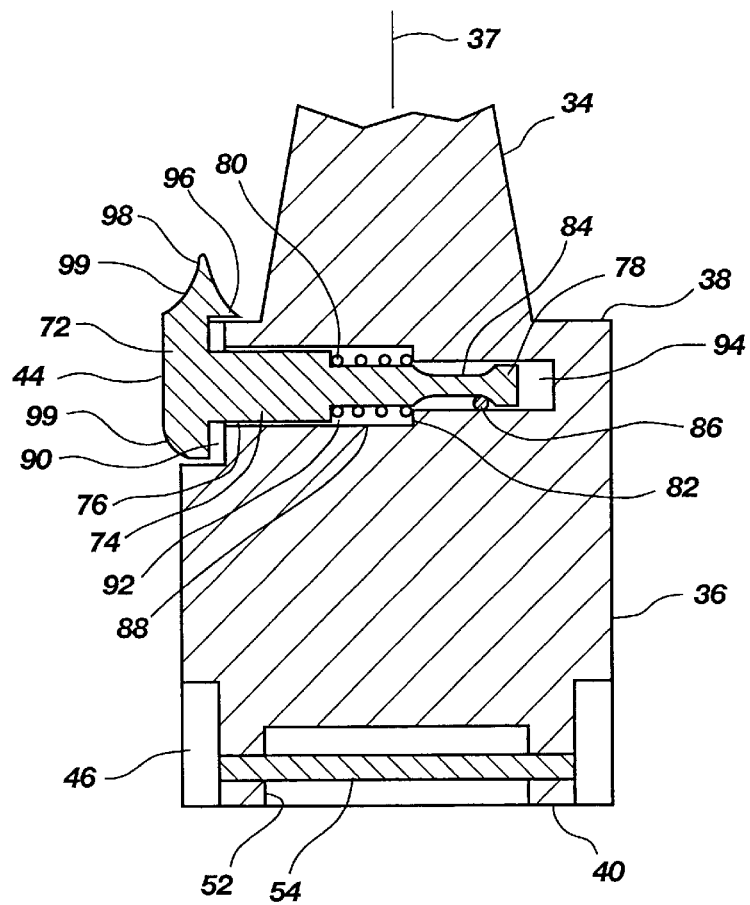
FIG. 7 is an enlarged break-away cross sectional view of a ball hitch illustrating a locking member.

Referring now to FIG. 7, an enlarged break-away cross sectional view is shown of the ball hitch 30 illustrating the locking member 44. The locking member 44 may form a resilient means for locking a ball hitch to a sleeve within the scope of the present invention. The locking member 44 may be positioned in the base portion 36 so as to extend in an axial direction substantially perpendicular to the longitudinal axis 37, to lock the ball hitch 30 to the sleeve 26. The locking member 44 may include a blocking portion 72 and a plunger portion 74. The plunger portion 74 may include a first end portion 76 attached to the blocking portion 72, and a second end portion 78. The first end portion 76 may have a larger diameter than the second end portion 78.

The locking member 44 may also have a resilient member or spring 80 to bias the locking member 44 outwardly from the base portion 36. The spring 80 may be positioned around an exterior of the second end portion 78 so as to abut against the larger diameter first end portion 76. The spring 80 may also be positioned to abut against a ledge 82 formed in the base portion 36 so that the locking member 44 may be biased outwardly from the base portion 36. The spring 80 may be constructed of stainless steel, for example, so that the spring 80 does not corrode. However, it will be appreciated that the spring 80 may be constructed of other suitable materials known in the art.

The second end portion 78 may have a recess 84 for receiving a stop member 86 to limit the extent of axial movement of the locking member 44. The stop member 86 may be formed as a pin extending through the base portion 36 in a direction substantially perpendicular to the locking member 44. The stop member 86 may be rigidly fixed in place so that when the locking member 44 is moved axially, the ends of the recess 84 abut the stop member 86 to limit movement of the locking member 44. It will be appreciated that the stop member 86 may be positioned in the recess 84 either below the second end portion 78 of the plunger 74, or above the second end portion 78, and that the stop member 86 may be fixed to the base portion 36 using various techniques known in the art such as welding, adhesive, or frictional attachment for example.

The locking member 44 may be positioned within a pocket 88 formed in the base portion 36. The pocket 88 may include an outer portion 90 configured for receiving the blocking portion 72 of the locking member 44. The pocket 88 may also include an intermediate portion 92 for receiving the first end portion 76 of the plunger 74, and an interior portion 94 for receiving the second end portion 78 of the plunger 74. The interior portion 94 of the pocket 88 may have a smaller diameter than the intermediate portion 92 of the pocket to form the ledge 82 for abutting with the spring 80.

The locking member 44 may also include a lip 96 on the blocking portion 72 for covering an upper side of the pocket 88 to prevent debris from falling into the pocket 88 when the locking member 44 is extended outwardly from the base portion. The locking member 44 may also include a tab 98 for applying a force to move the locking member 44 against the bias of the spring 80. The tab 98 may project above the upper surface 38 of the base portion 36 to facilitate access to the tab 98 and to be visible so that the locked or unlocked status of the locking member 44 can be visually detected.

The locking member 44 may also include cam surfaces 99 on the upper and lower sides of the blocking portion 72. The cam surfaces 99 may be shaped such that when the ball hitch 30 is inserted into the sleeve 26, contact between the sleeve 26 and the cam surface 99 forces the locking member 44 inward so that the ball hitch 30 may be inserted into the sleeve 26 without getting caught on the locking member 44. It will be appreciated that the cam surfaces 99 may be positioned on the upper and lower sides of the blocking portion 72 so that the ball hitch 30 may be inserted into the sleeve 26 in both an upright orientation and an inverted orientation without being blocked by the locking member 44.

It will be appreciated that the hitch assembly 14 of the present invention may be constructed of high strength, durable materials known in the art. For example, the ball hitch 30 may be machined from a stress-proof steel material having a yield strength of 115,000 pounds per square inch, such that the neck portion 34 undergoes less than one degree of deflection under a load of 45,000 pounds. Also, the sleeve 26 may be constructed of one-half inch wall cold drawn tubing. However, it will be appreciated that the hitch assembly 14 may be made of various different materials known in the art within the scope of the present invention.

In use, the ball hitch 30 may be placed in the sleeve 26 with the ball portion 32 facing upwardly as shown in FIGS. 2–3. The slot 46 may be aligned with the projection 48 by rotating the ball hitch 30 until the projection 48 enters into the first portion 62 of the slot 46. The ball hitch 30 may then be lowered further as the slot 46 passes over the projection 48 until the second portion 64 of the slot 46 becomes aligned with the projection 48. The ball hitch 30 may then be rotated such that the projection 48 passes beyond the ridge 70, and through the dip 68 to the terminal portion 66 of the slot 46. The ball hitch 30 may be lifted during rotation of the ball hitch 30 as the projection 48 comes in contact with the dip 68 so that the projection 48 may be directed through the dip 68 to be positioned in the terminal portion 66 of the slot 46. When the projection 48 is positioned at the terminal portion 66 of the slot 46, the blocking portion 72 of the locking member 44 may be aligned with the keeper 58. The spring 80 may then force the blocking portion 72 to extend into the keeper 58 so that the blocking portion 72 abuts with the sidewalls 60 of the keeper 58 to prevent further rotation of the ball hitch 30. In this position, vertical movement of the ball hitch 30 is prevented by engagement of the terminal portion 66 of the slot 46 with the projection 48. Accordingly, the ball hitch 30 is locked in place. The locked condition of the ball hitch 30 can be verified by observing the locking member 44 in the keeper 58.

Figure 8:
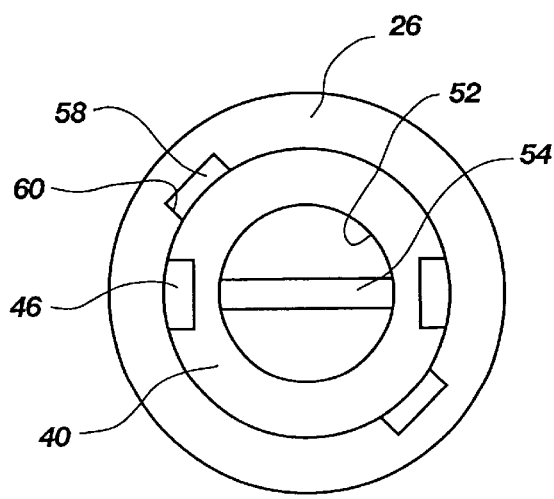
FIG. 8 is a plan view of the ball hitch of FIG. 4 stored in the inverted position in the receiver cylinder.

To remove the ball hitch 30 from the sleeve 26, a force may be applied to the tab 98 of the locking member 44, pushing the locking member 44 toward the center of the ball hitch 30. The blocking portion 72 may then be allowed to bypass the sidewall 60 of the keeper 58 so that the ball hitch 30 may be rotated in a direction opposite the direction used to install the ball hitch 30. The ball hitch 30 may be lifted during rotation in a similar manner as is done during installation of the ball hitch 30 to guide the slot 46 with respect to the projection 48. Once the first portion 62 of the slot 46 becomes aligned with the projection 48, the ball hitch 30 may be lifted out of the sleeve 26. The ball hitch 30 may then be stored in the sleeve 26 by inverting the ball hitch 30 as shown in FIG. 5. The handle 54 may be grasped to facilitate handling the ball hitch 30 to insert the ball portion 32 of the ball hitch 30 into the sleeve 26. The ball hitch 30 may be rotated to align the groove 50 with the projection 48, and the ball hitch 30 may be lowered such that the lower surface 40 of the ball hitch 30 is flush with the top of the sleeve 26, as is shown most clearly in FIG. 8. In this position, the cargo bed 12 of the tow vehicle remains unobstructed by the ball hitch 30, and the ball hitch 30 is safely stored.

It will be appreciated that the structure and apparatus disclosed herein is merely one example of a slot means for receiving a projection, and it should be appreciated that any structure, apparatus or system for receiving a projection which performs functions the same as, or equivalent to, those disclosed herein are intended to fall within the scope of a slot means for receiving a projection, including those structures, apparatus or systems for receiving a projection which are presently known, or which may become available in the future. Anything which functions the same as, or equivalently to, a slot means for receiving a projection falls within the scope of this element.

It will be appreciated that the structure and apparatus disclosed herein is merely one example of a resilient means for locking a ball hitch to a sleeve, and it should be appreciated that any structure, apparatus or system for locking a ball hitch to a sleeve which performs functions the same as, or equivalent to, those disclosed herein are intended to fall within the scope of a resilient means for locking a ball hitch to a sleeve, including those structures, apparatus or systems for locking a ball hitch to a sleeve which are presently known, or which may become available in the future. Anything which functions the same as, or equivalently to, a resilient means for locking a ball hitch to a sleeve falls within the scope of this element.

In accordance with the features and combinations described above, a useful method of operating a ball hitch includes the steps of:

(a) installing the ball hitch in a sleeve by inserting the ball hitch in the sleeve and rotating the ball hitch to a locked condition where a locking member on the ball hitch snaps into a keeper on the sleeve;

(b) removing the ball hitch from the sleeve by depressing the locking member to release the locking member from the keeper, rotating the ball hitch, and lifting the ball hitch out of the sleeve; and (c) storing the ball hitch by inserting the ball hitch in the sleeve in an inverted orientation such that a bottom portion of the ball hitch is positioned flush with a top of the sleeve.

Those having ordinary skill in the relevant art will appreciate the advantages provided by the features of the present invention. For example, it is a feature of the present invention to provide a hitch assembly that is simple to use. It is a another feature of the present invention to provide a hitch assembly in which the ball hitch can be removed from the cylinder, inverted, and replaced in the cylinder for storage such that the ball hitch does not provide an obstruction in the cargo bed of the tow vehicle. It is a further feature of the present invention, in accordance with one aspect thereof, to provide such a hitch assembly that has a locking member that can be visually checked to verify the locked status of the hitch assembly. The locking member is durable and configured to prevent debris from entering the locking member to render it inoperable. It is an additional feature of the present invention to provide a hitch assembly that has redundant locking features that enhance the safety of the hitch assembly.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A ball hitch for attaching to a sleeve in a cargo bed of a towing vehicle for use in towing a trailer, said ball hitch comprising:

a ball portion, a neck portion connected to said ball portion, and a base portion connected to said neck portion;

wherein said base portion of said ball hitch comprises slot means for receiving a sleeve projection when said ball hitch is placed in said sleeve in an upright orientation, and resilient means for locking said ball hitch to said sleeve, said base portion further comprising at least one groove for receiving said sleeve projection when said ball hitch is placed in said sleeve in an inverted orientation such that said ball hitch can be stored in said sleeve to prevent said ball portion and said neck portion from obstructing said cargo bed.

2. The ball hitch of claim 1, wherein said resilient means for locking said ball hitch to said sleeve comprises a spring biased plunger for projecting into a keeper in said sleeve.

3. The ball hitch of claim 2, wherein said spring biased plunger is configured to extend in an axial direction substantially perpendicular to a longitudinal axis of said ball hitch.

4. The ball hitch of claim 1, wherein said slot means comprises at least one slot having a first portion passing through a lower surface of said base portion along a side of said of said base portion and extending in a direction substantially parallel to a longitudinal axis of said ball hitch.

5. The ball hitch of claim 4, wherein said slot means further comprises a second portion extending in a lateral direction with respect to said first portion, said second portion having a terminal portion configured to hold said projection to prevent movement of said ball hitch with respect to said sleeve in said direction substantially parallel to said longitudinal axis.

6. The ball hitch of claim 5, wherein said second portion of said slot comprises a dip disposed between said terminal portion and said first portion of said slot.

7. The ball hitch of claim 6, wherein said slot further comprises a ridge disposed between said dip and said first portion of said slot.

8. A ball hitch assembly for attaching through a cargo bed of a towing vehicle for use in towing a trailer, said ball hitch assembly comprising:
- a sleeve for attaching through said cargo bed, said sleeve comprising an interior surface having at least one projection fixedly extending therefrom, and at least one keeper for receiving a locking member; and
- a ball hitch having a base portion for being received in said sleeve;
- wherein said base portion comprises at least one slot for receiving said at least one projection, said base portion further comprising said locking member for projecting into said keeper to lock said ball hitch to said sleeve.

9. The ball hitch assembly of claim 8, wherein said at least one keeper comprises a recess disposed on said interior surface of said of said sleeve.

10. The ball hitch assembly of claim 8, wherein said at least one keeper comprises two keepers disposed on opposite interior sides of said sleeve, and wherein said at least one projection comprises two projections disposed on opposite interior sides of said sleeve.

11. The ball hitch assembly of claim 8, wherein said at least one slot comprises two slots disposed on opposite sides of said base portion.

12. The ball hitch assembly of claim 9, wherein said recess comprises a sidewall configured to abut against a portion of said locking member to prevent said ball hitch from rotating with respect to said sleeve.

13. The ball hitch assembly of claim 8, wherein said base portion further comprises at least one groove extending through an upper surface of said base portion for receiving said at least one projection when said ball hitch is inserted in said sleeve in an inverted orientation.

14. The ball hitch assembly of claim 8, wherein said locking member is disposed in said base portion to extend in an axial direction substantially perpendicular to a longitudinal axis of said ball hitch.

15. A ball hitch for attaching to a sleeve in a cargo bed of a towing vehicle for use in towing a trailer, said ball hitch comprising:
- a ball portion, a neck portion connected to said ball portion for supporting said ball portion, and a base portion, said ball hitch defining a longitudinal axis extending from said ball portion to said base portion;
- wherein said base portion comprises resilient means for locking said ball hitch to said sleeve; and
- wherein said base portion further comprises at least one slot for receiving a projection in said sleeve, said at least one slot comprising a first portion passing through a lower surface of said base portion along a side of said base portion extending in a direction substantially parallel to said longitudinal axis, and a second portion extending in a lateral direction with respect to said first portion, said second portion of said slot having a terminal portion configured to hold said projection to prevent movement of said ball hitch with respect to said sleeve in a direction substantially parallel to said longitudinal axis.

16. The ball hitch of claim 15, wherein said second portion of said slot comprises a dip disposed between said terminal portion and said first portion of said slot.

17. The ball hitch of claim 16, wherein said slot further comprises a ridge disposed between said dip and said first portion of said slot.

18. The ball hitch of claim 15, wherein said resilient means for locking said ball hitch to a sleeve comprises a spring biased plunger for projecting into a keeper in said sleeve.

19. The ball hitch of claim 18, wherein said spring biased plunger is configured to extend in a direction substantially perpendicular to said longitudinal axis of said ball hitch.

20. The ball hitch of claim 15, wherein said base portion further comprises an upper surface and a side surface, and wherein at least one groove is disposed on said base portion along said side surface and passing through said upper surface for receiving said projection when said ball hitch is inserted in said sleeve in an inverted position.

21. A ball hitch for attaching to a sleeve in a cargo bed of a towing vehicle for use in towing a trailer, said ball hitch comprising:
- a ball portion, a neck portion connected to said ball portion, and a base portion, said ball hitch defining a longitudinal axis extending from said ball portion to said base portion;
- wherein said base portion comprises a locking member for locking said ball hitch to said sleeve, said locking member being resiliently biased to extend away from said base portion in an axial direction substantially perpendicular to said longitudinal axis.

22. The ball hitch of claim 21, wherein said locking member comprises a blocking portion and a plunger portion.

23. The ball hitch of claim 22, wherein said plunger portion comprises a first end portion attached to said blocking portion and a second end portion, and wherein said first end portion has a larger diameter than said second end portion.

24. The ball hitch of claim 23, wherein said plunger has a spring disposed on said second end portion for biasing said locking member to project from said base member.

25. The ball hitch of claim 23, wherein said second end portion has a recess for receiving a stop to limit the extent of axial movement of the locking member.

26. The ball hitch of claim 21, wherein said locking member comprises a tab for applying a force to move said locking member.

27. The ball hitch of claim 21, wherein said base portion comprises a pocket for receiving said locking member.

28. The ball hitch of claim 27, wherein said locking member comprises a lip for covering a portion of said pocket to prevent debris from falling into said pocket.

29. The ball hitch of claim 23, wherein said base portion comprises a pocket for receiving said locking member, wherein said pocket comprises an outer portion for receiving said blocking portion, an intermediate portion for receiving said first end portion of said plunger, and an interior portion for receiving said second end portion of said plunger, wherein said interior portion of said pocket has a smaller diameter than said intermediate portion of said pocket.

30. The ball hitch of claim 21, wherein said locking member is positioned on an upper surface of said base member so as to be visible to indicate a locked condition of the ball hitch.

31. The ball hitch of claim 21, further comprising slot means for receiving a sleeve projection when said ball hitch is placed in said sleeve in an upright orientation.

32. The ball hitch of claim 21, wherein said base portion further comprises at least one groove extending through an upper surface of said base portion for receiving said at least one projection when said ball hitch is inserted in said sleeve in an inverted orientation.

33. A ball hitch for attaching to a towing vehicle for use in towing a trailer, said ball hitch comprising:

a ball portion, a neck portion connected to said ball portion, and a base portion for being received in a sleeve, said base portion comprising an upper surface adjacent to said neck portion and a lower surface on an end of said base portion opposite said upper surface;

wherein said base portion comprises a locking member and at least one slot for receiving a projection in said sleeve when said ball hitch is positioned in said sleeve in an upright orientation, said at least one slot passing through said lower surface of said base portion, and wherein said base portion further comprises at least one groove for receiving said projection in said sleeve when said ball hitch is positioned in said sleeve in an inverted orientation, said at least one groove passing through said upper surface of said base portion.

34. The ball hitch of claim 33, wherein said at least one slot is spaced apart from said at least one groove such that said at least one slot does not intersect said at least one groove.

35. The ball hitch of claim 33, wherein said at least one groove is formed along a side of said base portion in a direction substantially parallel with a longitudinal axis of said ball hitch.

36. The ball hitch of claim 33, wherein said at least one slot comprises a first portion passing through said lower surface along a side of said base portion and extending in a direction substantially parallel with a longitudinal axis of said ball hitch.

37. The ball hitch of claim 36, wherein said at least one slot further comprises a second portion extending in a lateral direction with respect to said first portion.

38. The ball hitch of claim 33, wherein said locking member comprises a spring to bias said locking member away from said base portion in an axial direction substantially perpendicular to a longitudinal axis of said ball hitch.

39. The ball hitch of claim 37, wherein said at least one slot is spaced apart from said at least one groove such that said at least one slot does not intersect said at least one groove;

wherein said locking member is resiliently biased to extend in an axial direction substantially perpendicular to said longitudinal axis;

wherein said locking member comprises a blocking portion and a plunger portion;

wherein said plunger portion comprises a first end portion attached to said blocking portion and a second end portion, and wherein said first end portion has a larger diameter than said second end portion;

wherein said plunger has a spring disposed on said second end portion;

wherein said second end portion has a recess for receiving a stop to limit the extent of axial movement of the locking member;

wherein said locking member comprises a tab for applying a force to move said locking member;

wherein said base portion comprises a pocket for receiving said locking member;

wherein said locking member comprises a lip for covering a portion of said pocket to prevent debris from falling into said pocket;

wherein said pocket comprises an outer portion for receiving said blocking portion of said locking member, an intermediate portion for receiving said first end portion of said plunger, and an interior portion for receiving said second end portion of said plunger, wherein said interior portion of said pocket has a smaller diameter than said intermediate portion of said pocket;

wherein said locking member is positioned adjacent said upper surface of said base member so as to be visible to indicate a locked condition of the ball hitch;

wherein said second portion of said slot has a terminal portion configured to hold said projection to prevent movement of said ball hitch with respect to said sleeve in a direction substantially parallel to said longitudinal axis;

wherein said second portion of said slot comprises a dip disposed between said terminal portion and said first portion of said slot; and wherein said slot further comprises a ridge disposed between said dip and said first portion of said slot.

* * * * *